(12) United States Patent
Furui (10) Patent No.: US 8,272,748 B2
(45) Date of Patent: Sep. 25, 2012

(54) PROJECTION-TYPE DISPLAY APPARATUS AND METHOD FOR PERFORMING PROJECTION ADJUSTMENT

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 512 days.

(21) Appl. No.: 12/619,091

(22) Filed: Nov. 16, 2009

(65) Prior Publication Data
US 2010/0128231 A1 May 27, 2010

(30) Foreign Application Priority Data
Nov. 26, 2008 (JP) ................................ 2008-301500

(51) Int. Cl.
G03B 21/14 (2006.01)
G03B 3/00 (2006.01)

(52) U.S. Cl. ........................................ 353/70; 702/104

(58) Field of Classification Search .................... 353/70, 353/101, 121; 702/85, 104
See application file for complete search history.

(56) References Cited

U.S. PATENT DOCUMENTS

| 5,608,849 A * | 3/1997 | King, Jr. ...................... 345/419 |
| 7,125,122 B2 | 10/2006 | Li et al. |
| 2010/0110180 A1* | 5/2010 | Tonogai et al. ............... 348/136 |

FOREIGN PATENT DOCUMENTS

| JP | A-9-197249 | 7/1997 |
| JP | A-2000-28901 | 1/2000 |
| JP | B2-3761563 | 3/2006 |

* cited by examiner

Primary Examiner — Seung C Sohn
(74) Attorney, Agent, or Firm — Oliff & Berridge, PLC (57) ABSTRACT

A projection-type display apparatus that projects an image toward a projection surface and displays the image thereon, the apparatus includes: a projecting section that includes a focal length adjusting mechanism and projects an image; an adjustment image controlling section that uses the projecting section to project a guide display image suggesting how to adjust the position where the projection-type display apparatus is installed and uses the projecting section to project a calibration image having a predetermined shape when the guide display image is projected; a projection distance measuring section that measures a projection distance that is the distance to the projection surface based on a captured image obtained by capturing the calibration image; and a focus adjusting section that operates the focal length adjusting mechanism based on the projection distance to perform focus adjustment so that the displayed guide display image is brought into focus.

9 Claims, 9 Drawing Sheets

COMBINED IMAGE

FIG. 3A

GUIDE DISPLAY IMAGE

FIG. 3B

CALIBRATION IMAGE

CAPTURED IMAGE

FIG. 5A

IMAGE FOR MEASUREMENT

FIG. 5B

MEASUREMENT POINT DISTRIBUTION

THIRD EXAMPLE

FIG. 9

SECOND COMBINED IMAGE

FIG. 10A

THIRD COMBINED IMAGE

FIG. 10B

PROJECTION-TYPE DISPLAY APPARATUS AND METHOD FOR PERFORMING PROJECTION ADJUSTMENT

BACKGROUND

1. Technical Field

The present invention relates to a projection-type display apparatus that projects an image toward a projection surface and a method for performing projection adjustment.

2. Related Art

There has been a known technology of performing trapezoidal distortion correction, focus adjustment, and other corrections and adjustments (hereinafter referred to as projection adjustment) on an image projected (hereinafter referred to as a "projected image") by a projection-type display apparatus represented by a projector using a liquid crystal panel or any other suitable light modulator to form an image. To perform the projection adjustment, the projection-type display apparatus projects a guide display. The guide display is a display (such as characters and icons) that prompts a user to adjust the position where the body of the projection-type display apparatus is installed (hereinafter referred to as "install position adjustment") so that a projected image projected by the projection-type display apparatus is projected within a screen or any other suitable projection surface. The user, who visually recognizes the guide display projected on the screen, a wall outside the frame of the screen, or any other place, performs the install position adjustment. After the install position adjustment is completed, the projection adjustment is initiated (see Japanese Patent No. 3,761, 563).

When the projection adjustment is performed in the order described above, however, the guide display is projected before the focus adjustment is performed on the projected image. The projected image is therefore not in focus, which makes it difficult to visually recognize the displayed contents of the guide display. As a result, the guide display cannot disadvantageously fully serve its intended purpose. Further, when the angle between the optical axis of the projection light projected by the projection-type display apparatus and the projection surface (hereinafter referred to as a "projection angle") significantly deviates from 90 degrees, the position of the projected image within the projection surface (hereinafter referred to as a "projection position") before the trapezoidal distortion of the projected image is corrected greatly differs from the position of the projected image after the trapezoidal distortion correction is performed. It has been therefore pointed out that only the guide display projected before the trapezoidal distortion is corrected does not allow the user to adjust the install position so that every image is projected in a user's desired projection position.

SUMMARY

An advantage of some aspects of the invention is to provide a technology that readily allows the user to visually recognize a guide display when the user performs install position adjustment and performs the install position adjustment so that a user's desired install position is achieved.

To achieve the advantage described above, the invention can be implemented in the following forms or applications.

First Application

A projection-type display apparatus that projects an image toward a projection surface and displays the image thereon, the apparatus including a projecting section that includes a focal length adjusting mechanism and projects an image, an adjustment image controlling section that uses the projecting section to project a guide display image suggesting how to adjust the position where the projection-type display apparatus is installed and uses the projecting section to project a calibration image having a predetermined shape when the guide display image is projected, a projection distance measuring section that measures a projection distance that is the distance to the projection surface based on a captured image obtained by capturing the calibration image, and a focus adjusting section that operates the focal length adjusting mechanism based on the projection distance to perform focus adjustment so that the displayed guide display image is brought into focus.

Since the projection-type display apparatus projects the calibration image having a predetermined shape and performs focus adjustment when the guide display image is projected, the guide display image can be brought into focus and projected on the projection surface. Alternatively, when a user who visually recognizes the guide display adjusts the position where the projection-type display apparatus is installed after the focus adjustment, the projection-type display apparatus may detect the position adjustment operation and perform focus adjustment again based on the calibration image being projected.

Second Application

The projection-type display apparatus according to the first application, wherein the adjustment image controlling section superimposes the guide display image and the calibration image on each other to form a single image and projects the single image by using the projecting section.

Since the projection-type display apparatus projects the calibration image simultaneously with the guide display image, the focus adjustment in which the guide display image is brought into focus can be performed in a short period.

Third Application

The projection-type display apparatus according to the second application, wherein the calibration image is disposed at the periphery of the guide display image in the single superimposed image.

According to the projection-type display apparatus, the calibration image is disposed at the periphery of the guide display image. Therefore, even when the calibration image and the guide display image are projected outside the screen, part of the calibration image and the guide display image are likely to be projected within the screen as compared to other arrangements. Therefore, even when the two images are projected somewhat outside the screen, the projected guide display image can be brought into focus.

Fourth Application

The projection-type display apparatus according to the first application, wherein the calibration image is projected during at least part of the period when the guide display image is projected.

Since the projection-type display apparatus projects the calibration image during at least part of the period when the guide display image is projected, the projected guide display image can be brought into focus.

Fifth Application

The projection-type display apparatus according to the first application, wherein the calibration image has a shape capable of at least identifying three coordinates that can define a plane.

According to the projection-type display apparatus, since the shape of the calibration image allows three points that can define a plane to be extracted, a captured image produced based on the calibration image also allows three points that can define a plane to be extracted.

Sixth Application

The projection-type display apparatus according to the first application further including a trapezoidal distortion correcting section that corrects trapezoidal distortion of a projected image projected by the projection-type display apparatus based on a captured image obtained by capturing the calibration image.

Since the projection-type display apparatus may further include the trapezoidal distortion correcting section, a trapezoidal distortion-free image can be projected even when the projection surface is not perpendicular to the optical axis of the projection-type display apparatus.

Seventh Application

The projection-type display apparatus according to the sixth application, wherein the trapezoidal distortion correcting section performs the trapezoidal distortion correction after the focus adjustment is performed.

Since the projection-type display apparatus performs the trapezoidal distortion correction after the focus adjustment is performed, a guide display image having undergone the focus adjustment and the trapezoidal distortion correction can be projected on the projection surface.

Eighth Application

The projection-type display apparatus according to the seventh application, wherein the trapezoidal distortion correction is performed after the projection of the guide display image is completed.

Since the projection-type display apparatus performs the trapezoidal distortion correction after the projection of the guide display image is completed, the trapezoidal distortion correction is performed after the user has adjusted the install position, whereby the trapezoidal distortion correction can be performed precisely.

Ninth Application

A projection adjustment method used with a projection-type display apparatus that projects an image toward a projection surface and displays the image thereon, the method including projecting a guide display image suggesting how to adjust the position where the projection-type display apparatus is installed, projecting a calibration image having a predetermined shape when the guide display image is projected, measuring a projection distance that is the distance to the projection surface based on a captured image obtained by capturing the calibration image, and operating a focus adjusting mechanism based on the projection distance to perform focus adjustment so that the displayed guide display image is brought into focus.

According to the projection adjustment method, since the calibration image having a predetermined shape is projected and the focus adjustment is performed when the guide display image is projected, the position where the projection-type display apparatus is installed can be adjusted while the focused guide display image is checked.

The invention can be implemented in a variety of aspects. For example, the invention can be implemented in the form of a projection surface detection method and apparatus, a projection image correction method and apparatus, an integrated circuit or a computer program for performing the methods or the functions of the apparatus described above, and a recording medium on which the computer program is recorded.

BRIEF DESCRIPTION OF THE DRAWINGS

The invention will now be described with reference to the accompanying drawings, wherein like numbers reference like elements.

DESCRIPTION OF EXEMPLARY EMBODIMENTS

An embodiment of the invention will be described with reference to examples.
A. First example
A1. Overall configuration of projector
A2. Projection adjustment
A3. Three-dimensional survey
A4. Focus adjustment
A5. Trapezoidal distortion correction
B. Second example
C. Third example
D. Variations

A. FIRST EXAMPLE

A1. Overall Configuration of Projector

Figure 1:
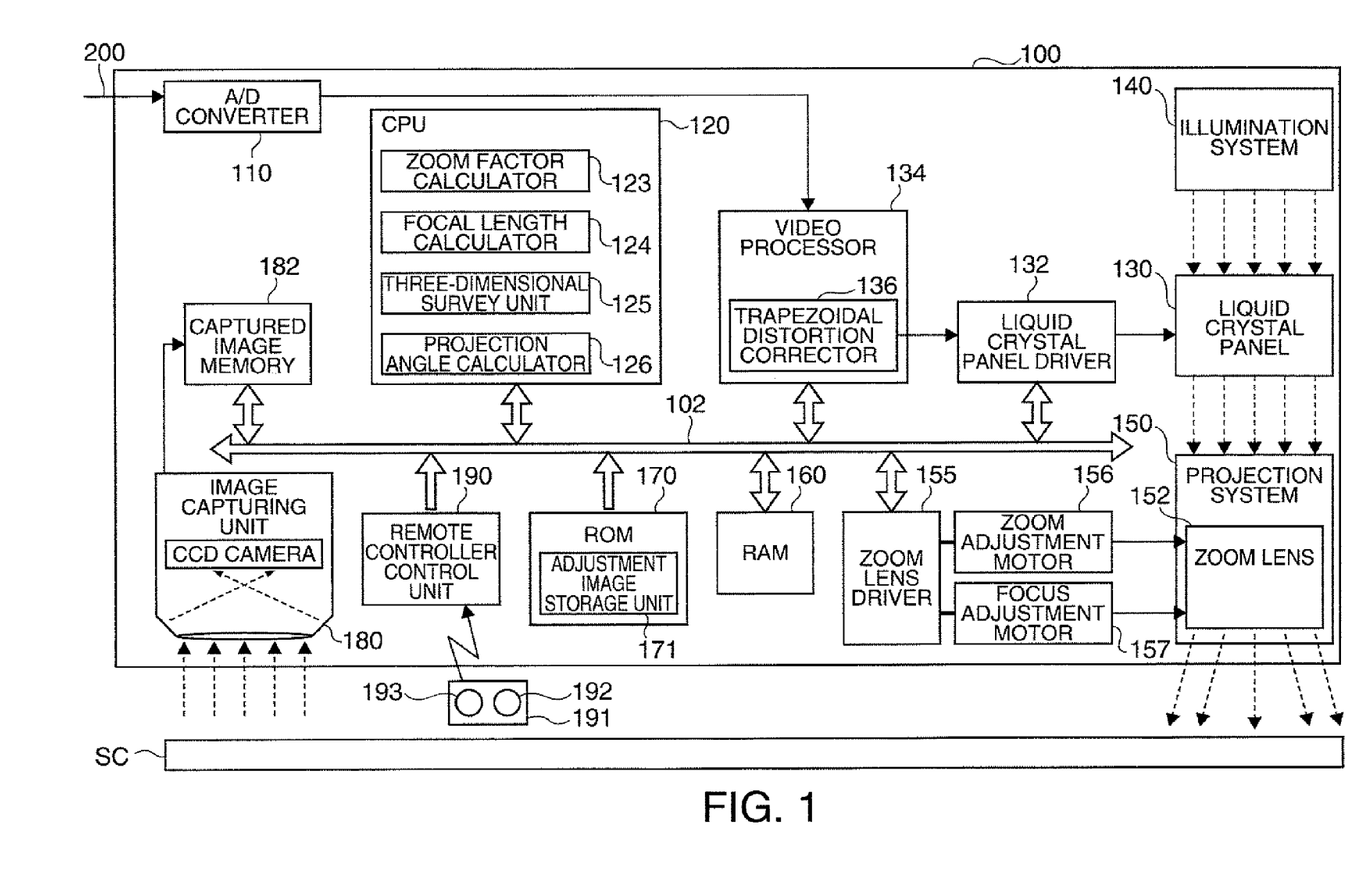
FIG. 1 is a block diagram showing the configuration of a projector 100 in a first example.

FIG. 1 is a block diagram showing an overall configuration of a projector 100 in a first example of the invention. The projector 100 externally receives an image signal representing an image and displays the image signal as the image (hereinafter referred to as a "projected image") on a screen SC or any other suitable projection surface. In the present example, the screen plane has a rectangular shape.

The projector 100 can be roughly divided into an optical system that forms an optical image and an image processing system that electrically processes a video signal. The optical system includes an illumination system 140, a liquid crystal panel 130, and a projection system 150 and corresponds to the projection section in the claims. The illumination system 140 includes an arc lamp (not shown) and outputs the light from the arc lamp as the light used for projection. The liquid crystal panel 130 receives a signal from the image processing system, which will be described later, and forms an image on the panel surface. The liquid crystal panel 130 is formed of three liquid crystal panels corresponding to RGB three primary colors to perform color projection. To this end, the light from the illumination system 140 is divided into RGB three color light beams, which are incident on the liquid crystal panels corresponding thereto. The color light beams are modulated when passing through the liquid crystal panels, combined in a cross dichroic prism or any other suitable combining system, and directed toward the projection system 150.

The projection system 150 includes a zoom lens 152 that enlarges or shrinks a projected image and performs focus adjustment, a zoom adjustment motor 156 that adjusts how much the projected image is zoomed, and a focus adjustment motor 157 that performs the focus adjustment. The projection system 150 receives the light modulated by the liquid crystal panel 130 and forms a projected image on the screen SC through the zoom lens 152. The zoom adjustment motor 156 and the focus adjustment motor 157 adjust, for example, the position of the zoom lens 152 to perform zoom adjustment in which the projected image on the screen SC is enlarged or shrunk and focus adjustment in which a sharp projected image is formed on the screen SC.

On the other hand, the image processing system is primarily formed of a CPU 120 responsible for a substantial part of overall processing and a video processor 134 and further includes an A/D converter 110, a liquid crystal panel driver 132, a zoom lens driver 155, a RAM 160, a ROM 170 including an adjustment image storage unit 171, an image capturing unit 180, a captured image memory 182, a remote controller control unit 190, and a remote controller 191. The above elements that form the image processing system are connected to each other via a bus 102.

The A/D converter 110 is a device that converts an analog input signal inputted from a personal computer, a DVD player, or any other suitable image output apparatus through a cable 200 into a digital signal, and outputs the converted digital image signal to the video processor 134. The video processor 134 performs a variety of processing operations on the input digital image signal, such as adjustment of the brightness, contrast, color intensity, color tone, the shape of a projected image, and outputs the processed video signal to the liquid crystal panel driver 132. The liquid crystal panel driver 132 drives the liquid crystal panel 130 based on the video signal. As a result, the video images corresponding to the video signal inputted via the A/D converter 110 are formed on the liquid crystal panel 130 and in turn formed on the screen SC through the projection system 150.

Examples of the image processing performed in the video processor 134 include not only the brightness correction, contrast correction, color tone correction, and other types of correction but also trapezoidal distortion correction. FIG. 1 particularly shows a trapezoidal distortion corrector 136 as a circuit that performs trapezoidal distortion correction. The trapezoidal distortion corrector 136 corrects trapezoidal distortion of a projected image formed by the digital image signal based on a projection angle calculated by a projection angle calculator 126, which will be described later, provided in the CPU 120. The video processor 134 can be a general-purpose processor commercially available as a DSP (Digital Signal Processor) for trapezoidal distortion correction or may be a dedicated ASIC.

The CPU 120, which along with the video processor 134 performs image processing in the projector 100, includes a zoom factor calculator 123, a focal length calculator 124, a three-dimensional survey unit 125, and the projection angle calculator 126. To achieve these portions, the CPU 120 executes specific programs pre-stored in the ROM 170. These processing portions perform processing operations necessary to calculate, for example, the relative distance between the projector 100 and the screen SC (hereinafter referred to as a projection distance), which will be described later in detail, and the projection angle representing how much the screen SC is inclined to the optical axis of the projection light projected from the projector (hereinafter referred to as a projection angle).

The CPU 120 calculates the projection angle and the projection distance by using the corresponding portions provided in the CPU 120 and then outputs a signal corresponding to the projection angle and a signal corresponding to the projection distance to the video processor 134 and the zoom lens driver 155, respectively. The video processor 134 receives the signal corresponding to the projection angle from the CPU 120 and uses the signal to perform trapezoidal distortion correction. Once the projection angle, which is the angle between the optical axis of the optical system of the projector 100 and the screen SC, is known, how video images are distorted can be computed. The video processor 134, when a parameter corresponding to the projection angle is set therein, corrects the image inputted from the A/D converter 110 so that the distortion of the projected image is corrected, and outputs the corrected video signal to the liquid crystal panel driver 132.

On the other hand, the zoom lens driver 155, when it receives the signal corresponding to the projection distance from the CPU 120, drives the focus adjustment motor 157 based on the signal for focus adjustment. To perform the focus adjustment, it is necessary to know the zoom factor of the zoom lens. In the present example, the zoom factor is calculated from information indicating how much the zoom lens 152 is moved by the zoom adjustment motor 156. The zoom factor can, of course, be calculated by using an image captured by the image capturing unit 180, which will be described later.

A work area necessary for the above operations carried out by the CPU 120 is preserved in the RAM 160. The video processor 134 includes a built-in RAM as a work area necessary for the video processor 134 itself to carry out a variety of processes, such as adjustment of image display states. The ROM 170 stores not only the programs for achieving the processing units described above but also a guide display image and a calibration image used in projection adjustment, which will be described later. The ROM 170 corresponds to the adjustment image storage unit 171.

The remote controller control unit 190 receives an instruction from a user via the remote controller 191 and forwards the instruction to the CPU 120 via the bus 102. The remote controller 191 includes a projection adjustment button 192 and an adjustment stop button 193, and the user operates these buttons to start or stop the projection adjustment, which will be described later. While the projector 100 receives an instruction from the user via the remote controller control unit 190 and the remote controller 191 in the present example, the projector may receive an instruction from the user via any other suitable component, such as an operation panel provided in the projector 100.

The image capturing unit 180 will now be described. The image capturing unit 180 is provided on the front side of the projector 100, that is, in a position where the image capturing unit 180 can capture an image in the direction in which the projection system 150 projects video images toward the screen SC, and the direction in which a camera in the image capturing unit 180 is oriented and the angle of view of the camera are set in such a way that an entire projected image projected on the screen SC located at a recommended projection distance falls within at least the imaging range of the camera. The image capturing unit 180 includes a known CCD, a fixed-focal-length lens that forms video images on the CCD, a mechanism that adjusts the amount of light incident on the CCD, such as an automatic iris mechanism, and a control circuit that reads a video signal from the CCD. The automatic iris mechanism receives a signal from the control circuit, the signal corresponding to accumulated brightness of the video images from the CCD camera, and automatically adjusts an iris (diaphragm) provided in the fixed-focal-length lens in such a way that the accumulated brightness falls within a predetermined range. The image whose brightness has been adjusted by the auto iris mechanism is outputted from the image capturing unit 180 to the captured image memory 182 and repeatedly written in a predetermined area of the captured image memory 182. Whenever the captured image memory 182 writes image data corresponding to a single screen, the flag for the predetermined area is reversed. Therefore, the CPU 120 refers to the flag and can judge whether or not the image capturing unit 180 has completed the imaging operation. The CPU 120 refers to the flag and accesses the captured image memory 182 to acquire a necessary captured image.

A2. Projection Adjustment

To ensure that a projected image projected by the projector 100 is an image desired by the user, the user performs install position adjustment in which the position where the projector body is installed is adjusted to adjust the position where the projected image is projected, and the projector 100 performs projection adjustment (the focus adjustment and the trapezoidal distortion correction in the present example) as an internal process. The projection adjustment in the present example is characterized in that it is performed concurrently with the install position adjustment performed by the user, as described below.

Figure 2:
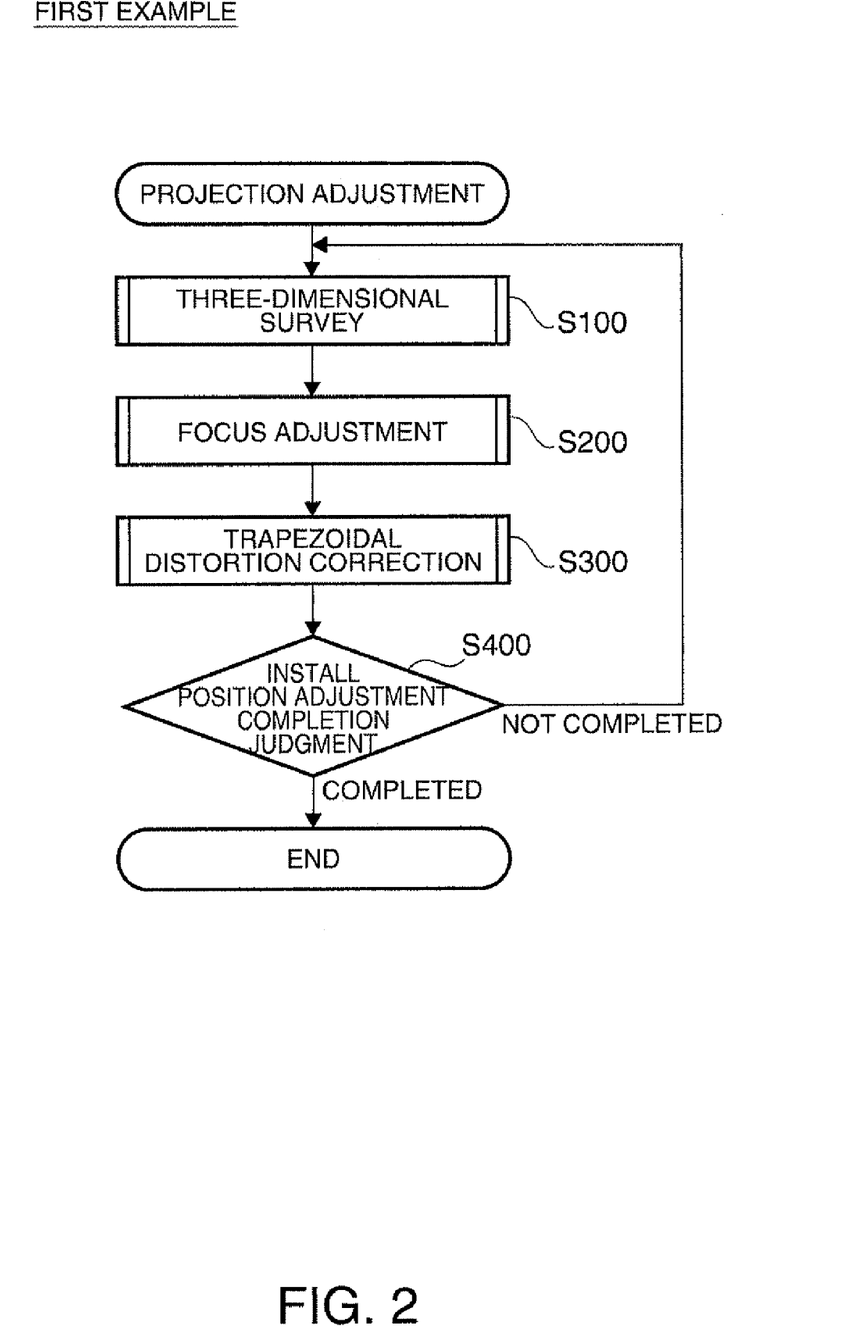
FIG. 2 is a flowchart showing projection adjustment in the first example.

FIG. 2 shows the procedure of the projection adjustment. The projection adjustment in the first example is initiated by the user when the user operates the projection adjustment button 192, and formed of three subroutines, three-dimensional survey (step S100), focus adjustment (step S200), and trapezoidal distortion correction (step S300), and install position adjustment judgment (step S400).

In the three-dimensional survey (step S100), the video processor 134 combines a guide display image 315 (FIGS. 3A to 3C) and a calibration image 325 stored in the adjustment image storage unit 171, and a single combined image 330 is projected on the screen SC. This process corresponds to the adjustment image control section in the claims. After the combined image 330 is projected on the screen SC, the image capturing unit 180 captures the combined image 330 to acquire a captured image. Based on the captured image that has been acquired, an image for measurement is detected. After the image for measurement is detected, the relationship between the projector 100 and the screen SC indicating how they are relatively arranged in a three-dimensional space is calculated based on the image for measurement. The arrangement relationship used herein includes the projection distance, which is the distance from the projector 100 to the screen SC, and the projection angle, which indicates how much the screen plane is inclined to the optical axis of the projection light projected by the projector 100.

The focus adjustment (step S200), in which the projected image is brought into focus, is then performed based on the projection distance calculated by the three-dimensional survey. After the focus adjustment is completed, the trapezoidal distortion correction (step S300), in which the projected image is corrected in terms of trapezoidal distortion, is performed based on the projection angle calculated by the three-dimensional survey.

The install position adjustment completion judgment (step S400) is then made to judge whether or not the user has completed the install position adjustment. The judgment can be made, for example, by checking whether or not the user has operated the adjustment stop button 193. When the user operates the adjustment stop button 193, the present projection adjustment routine is terminated. On the other hand, until the user operates the adjustment stop button, it is judged that the projection adjustment is not yet completed, and the control returns to the step S100. The three-dimensional survey (step S100), the focus adjustment (step S200), and the trapezoidal distortion correction (step S300) described above are then repeated. That is, it is assumed that the projection adjustment in the present example is performed concurrently with the install position adjustment performed by the user.

Figure 3A:
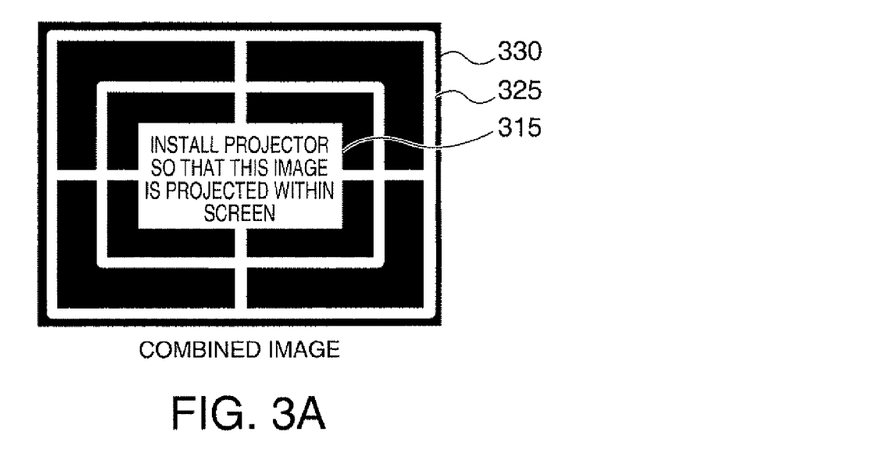
FIGS. 3A, 3B and 3C describe images used in the projection adjustment.

To carry out the above processes under the assumption described above, in the present example, the combined image 330 projected during the three-dimensional survey includes the guide display image 315, which is a display that prompts the user to perform the install position adjustment. FIG. 3A shows an example of the combined image 330. As shown in FIG. 3A, the combined image 330 in the present example includes the guide display image 315 at the center and the calibration image 325 at the periphery. The guide display image 315 includes a white rectangular area at the center, and a character string that prompts the user to adjust the position where the projector is installed is projected in black in the central area, as separately shown in FIG. 3B. On the other hand, the calibration image 325 present at the periphery of the guide display image 315 is a white figure having two similarly shaped, differently sized, concentrically arranged rectangular contours with a predetermined width superimposed on cross lines with a predetermined width in such a way that the intersection of the cross lines coincides with the common center of the two rectangular contours, as separately shown in FIG. 3C. The calibration image is used in the three-dimensional survey of the screen plane, which will be described later. The calibration image 325 may have any shape whose property allows three measurement points that can define a plane to be extracted. The guide display image 315 and the calibration image 325 having the characteristics described above are combined into the combined image 330.

When the three-dimensional survey is initiated, the combined image 330 is projected. At the point when the projection of the combined image 330 is initiated, the focus adjustment and the trapezoidal distortion correction has not yet been performed on the projected image, but immediately after the projection is initiated, the projection adjustment shown in FIG. 2 is performed. Performing the focus adjustment (step S200) allows the guide display image 315 to be brought into focus, and performing the trapezoidal distortion correction (step S300) allows the trapezoidal distortion of the projected image to be corrected. Since these processes can be completed in a short period, the characters in the guide display image 315 will be sharply projected without distortion by the time when the user starts reading the character string in the guide display and adjusting the position where the projector 100 is installed by following the instruction expressed in the form of the character string. In this way, the user can refer to the guide display image 315 and smoothly perform the install position adjustment. When the user has installed the projector 100 in a desired position and checks that the projected image is in a desired state, the user operates the adjustment stop button 193 on the remote controller 191 (FIG. 1).

A detailed description will be made of each of the processes (steps S100 to 5300) in the projection adjustment routine shown in FIG. 2.

A3. Three-Dimensional Survey

The three-dimensional survey is a process of detecting the three-dimensional state of the plane including the screen SC based on the combined image 330 projected by the projector 100 in a three-dimensional coordinate system (hereinafter sometimes referred to as a "lens coordinate system") having its origin at the principal point of the zoom lens 152 of the projector 100. That is, the projection distance, which is the distance from the projector 100 to the screen SC, and the projection angle, which indicates how much the screen SC is inclined three-dimensionally with respect to the optical axis of the projection system in the projector 100, are detected, as described above.

The procedure of the three-dimensional survey will be described with reference to FIG. 4. The three-dimensional survey is initiated by the instruction to initiate the projection adjustment (when the user operates the projection adjustment button), as described above. When the three-dimensional survey is initiated, the CPU 120 reads the guide display image 315 (FIG. 3B) and the calibration image 325 stored in the adjustment image storage unit 171 of the ROM 170 and instructs the video processor 134 to produce the combined image 330 from the guide display image and the calibration image and project the combined image 330 (step S110). The video processor 134 that has received the instruction produces the combined image 330 and then outputs the combined image 330 to the liquid crystal panel 130 via the liquid crystal panel driver 132. At the timing when the combined image 330 is projected on the screen SC, the CPU 120 instructs the image capturing unit 180 to capture the combined image 330 and save the captured image (step S120). The image capturing unit 180 that has received the image capturing instruction adjusts the automatic iris mechanism to make the brightness and other parameters of the video images incident on the CCD suitable for the imaging operation and then captures the image. The image capturing unit 180 saves the image that has been captured (hereinafter referred to as a "captured image") in the captured image memory 182. When the captured image is saved, the flag is reversed. Therefore, the CPU 120 can check by monitoring the flag that the captured image has been saved in the captured image memory 182. FIG. 5A shows an exemplary captured image 340 saved in the captured image memory 182. When the optical axis of the projection system is not perpendicular to the screen SC, the captured image 340 has trapezoidal distortion as shown in FIG. 5A, unlike the combined image 330.

Figure 5A:
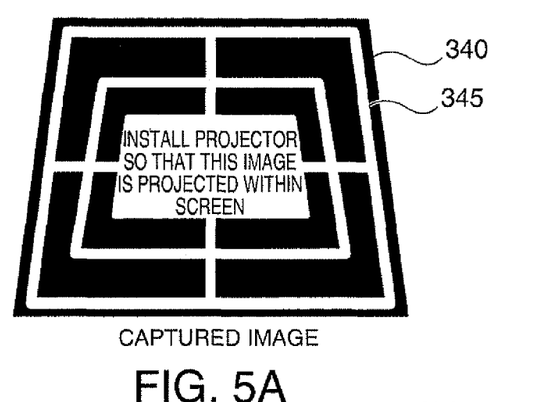
FIGS. 5A to 5C describe images used in the three-dimensional survey.
Figure 5B:
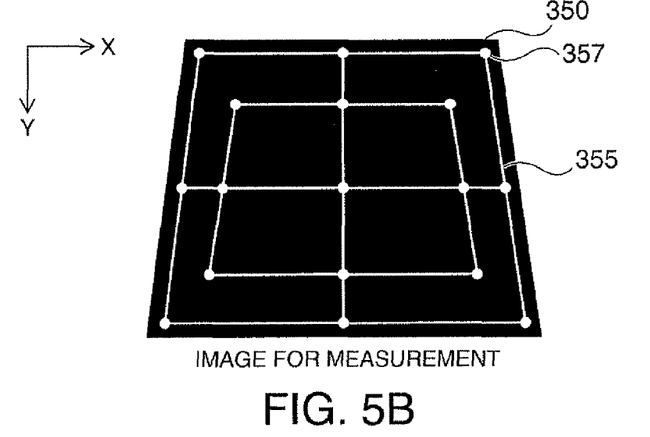

The captured image 340, after it has been captured, is digitized in terms of grayscale of the image so that an image for measurement 350 and lines for measurement 355 are detected (step S130). The digitization used herein involves scanning the coordinates of the two-dimensional plane including the captured image 340 in the horizontal and vertical directions, determining the distribution of the grayscales of the pixels, determining three centroid positions in each of the directions based on the grayscale distribution, and acquiring the lines for measurement 355, each of which is the center line of a calibration line 345 expressed by a white line in the captured image. In this way, even when the contours of the captured image 340 and the calibration lines 345 are blurred, the digitization allows the lines for measurement 355 to be uniquely determined. That is, even when the zoom lens 152 of the projector 100 has not been adjusted in terms of focus and hence the image projected on the screen SC is blurred, the lines for measurement 355 can be detected from the captured image 340 with blurred contours. FIG. 5B shows an example of the detected lines for measurement 355.

Figure 5C:
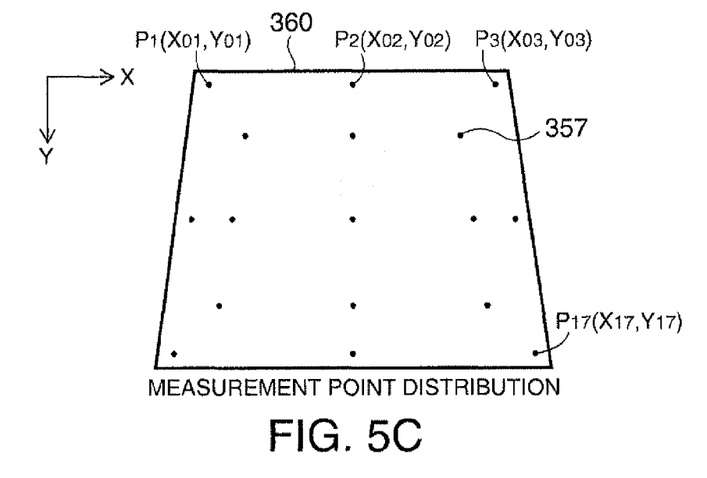

After the image for measurement 350 is detected, measurement points 357, which are the intersections of the white lines of the lines for measurement 355, are detected based on the lines for measurement 355 (step S140). As shown in FIG. 5C, 17 measurement points P1 to P17 at the maximum are detected from the lines for measurement 355 shown in FIG. 5B, and the thus detected measurement points can be expressed as P1(X01, Y01) to P17(X17, Y17).

Figure 4:
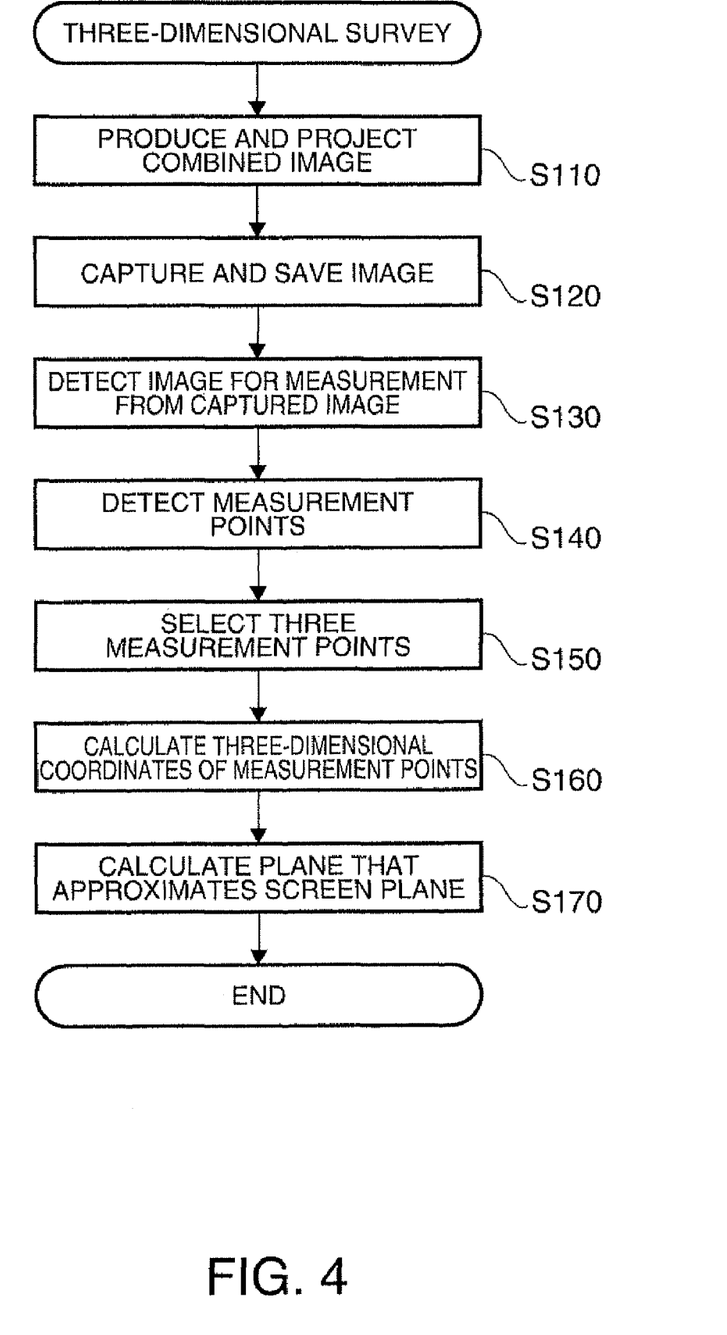
FIG. 4 is a flowchart showing three-dimensional survey in the first embodiment.

Among the 17 measurement points 357 detected in the step S140, three points that can define a plane are selected (step S150 in FIG. 4). In the selection of three points that can define a plane, any three points of the 17 measurement points 357 may be selected as long as the selected three points are not present on the same straight line. The reason why the 17 measurement points 357 are detected in the present example is that even when an obstacle or any other object is present between the projection system 150 and the screen SC and hence part of the combined image projected through the projection system 150 is not displayed on the screen SC, or even when an obstacle is present between the image capturing unit 180 and the screen SC and hence part of the combined image cannot be captured, measurement points 357 can be detected from part of the captured image 340, after it has been captured, and the measurement points 357 can be used to perform three-dimensional survey. Since the entire combined image 330 is not always within the screen SC when the user actually performs the install position adjustment, three points are selected from the inner nine measurement points in the three-dimensional survey.

The three-dimensional coordinates of the three selected measurement points 357 in the lens coordinate system are then detected (step S160). The detection of the three-dimensional coordinates of any of the measurement points 357 is carried out by using the parallax between the zoom lens 152 and the image capturing unit 180 along with an active stereoscopic method in which the triangulation principle is used to detect the three-dimensional coordinates. To detect the three-dimensional coordinates of any of the measurement points, the active stereoscopic method may not necessarily be used, but a passive stereoscopic method using a plurality of cameras may, for example, be used.

An approximated plane that approximates the plane including the screen SC is calculated based on the three-dimensional coordinates of the thus detected three measurement points 357 (step S170). Specifically, a least-square method using the three measurement points is used to derive an equation representing the approximated plane that approximates the plane including the screen plane. After the equation representing the approximated plane is derived, the three-dimensional survey is terminated. The processes (FIG. 4) carried out by the CPU 120 correspond to the three-dimensional survey unit 125 shown in FIG. 1.

A4. Focus Adjustment

The focus adjustment (step S200 in FIG. 2) will next be described in detail. The focus adjustment is a process of bringing a projected image into focus and carried out by the focal length calculator 124 as well as the zoom lens driver 155 and the focus adjustment motor 157 driven by commands from the focal length calculator 124 in the projector 100 shown in FIG. 1. The focus adjustment is actually carried out by the CPU 120 when it successively carries out the processes shown in the flowchart in FIG. 6.

Figure 6:
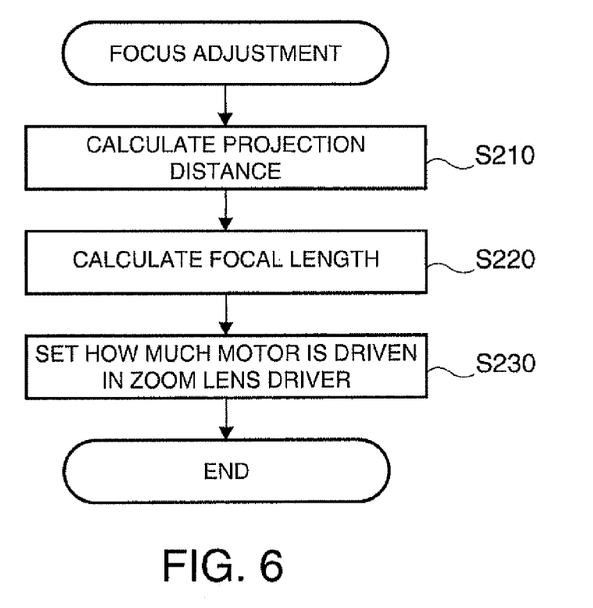
FIG. 6 is a flowchart showing focus adjustment in the first example.

FIG. 6 shows the procedure of the focus adjustment performed by the focal length calculator 124. When the focus adjustment is initiated, the CPU 120 first acquires the projection distance, which is the distance from the principal point of the zoom lens 152 to the screen SC, based on the plane that approximates the screen plane and is detected in the three-dimensional survey (step S210). The focal length calculator 124 then, based on the projection distance, calculates the focal length at which the projection light from the projector 100 forms a projected image on the screen SC (step S220). Finally, the focal length calculator 124 calculates an appropriate position of the zoom lens 152 that corresponds to the calculated focal length and how much the focus adjustment motor 157 is driven to move the lens to that position, sets the value representing how much the motor is driven in the zoom lens driver 155 (step S230), and then terminates the focus adjustment. The zoom lens driver 155 now having the value representing how much the motor is driven set therein drives the focus adjustment motor 157 based on the value to move the zoom lens 152 to the appropriate position. As a result, the projected image is brought into focus on the screen SC. The focus adjustment is thus completed. It is noted that the zoom factor of the zoom lens necessary to determine the projection distance from the information on the plane that approximates the screen plane determined in the three-dimensional survey is determined in the present example from the value representing how much the zoom lens 152 is moved by the zoom adjustment motor 156, as described above. The zoom factor can, of course, be calculated from the image captured by the image capturing unit 180.

A5. Trapezoidal Distortion Correction

The trapezoidal distortion correction will next be described. The trapezoidal distortion is distortion having a trapezoidal shape that occurs in an image projected by the projector 100 when the screen plane including the screen SC is not installed perpendicularly to the optical axis of the projection light projected from the projector 100.

Figure 7:
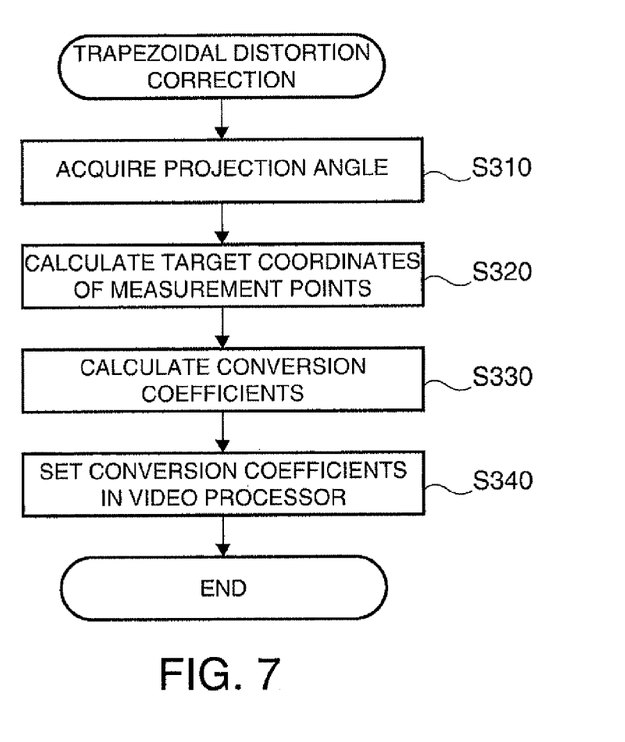
FIG. 7 is a flowchart showing trapezoidal distortion correction in the first example.

FIG. 7 shows the procedure of the trapezoidal distortion correction. When the trapezoidal distortion correction is initiated, the CPU 120 first calculates the projection angle, which is the angle between the plane that approximates the screen plane detected in the three-dimensional survey and the optical axis of the projection light projected from the projector 100 (step S310). Since the projection angle has actually been calculated in the three-dimensional survey (step 170 in FIG. 4), the projection angle is provided in this procedure by reading the projection angle data calculated in the three-dimensional survey and saved in a predetermined area of the RAM 160. The trapezoidal distortion corrector then carries out its process based on the calculated projection angle to calculate target coordinates of the projection points 357 where the projection angle with respect to the screen plane is 90 degrees (step S320). Finally, the CPU 120 calculates conversion coefficients that are used to convert the coordinates of the measurement points 357 into the target coordinates (step S330) and sets the coefficients in the video processor 134 (step S340). The trapezoidal distortion correction is thus completed.

After the trapezoidal distortion correction is completed, the video processor 134 uses the thus set coefficients to convert the input digital image signal and outputs the converted result to the liquid crystal panel driver 132. The coefficients set in the video processor 134 are coefficients used when a three-dimensional vector operation is performed on the information (coordinates) on the pixel positions contained in the input image signal.

The three-dimensional vector operation is carried out to convert the coordinates of each pixel into the coordinates where the trapezoidal distortion is corrected. Once the conversion coefficients are set, the video processor 134 repeats the vector operation on the coordinates of all pixels contained in the input digital image signal. The trapezoidal distortion of the projected image is thus corrected.

As described above, according to the projector 100 of the first example, when the user adjusts a projected image, the projector 100 displays a focused guide display that prompts the user to perform the install position adjustment. The user can therefore perform the install position adjustment while readily visually recognizing the guide display. When the user, who visually recognizes the guide display, initiates the install position adjustment, the projector 100 performs the projection adjustment concurrently with the install position adjustment performed by the user. The user can therefore adjust the position where a projected image is projected on the screen, that is, the position where the projector body is installed, while checking the result of the projection adjustment. Further, since projection adjustment is repeated until the user has completed the install position adjustment, the user can readily perform the install position adjustment, and the install position adjustment and the projection adjustment can provide results desired by the user.

B. SECOND EXAMPLE

A second example will next be described. The second example differs from the first example in that the three-dimensional survey, the focus adjustment, the trapezoidal distortion correction, and the install position judgment are performed in a different order. Since the configuration of the projector and what is done in the three-dimensional survey, the focus adjustment, the trapezoidal distortion correction, and the install position judgment in the present example are the same as those in the first example, no detailed redundant description will be made.

Figure 8:
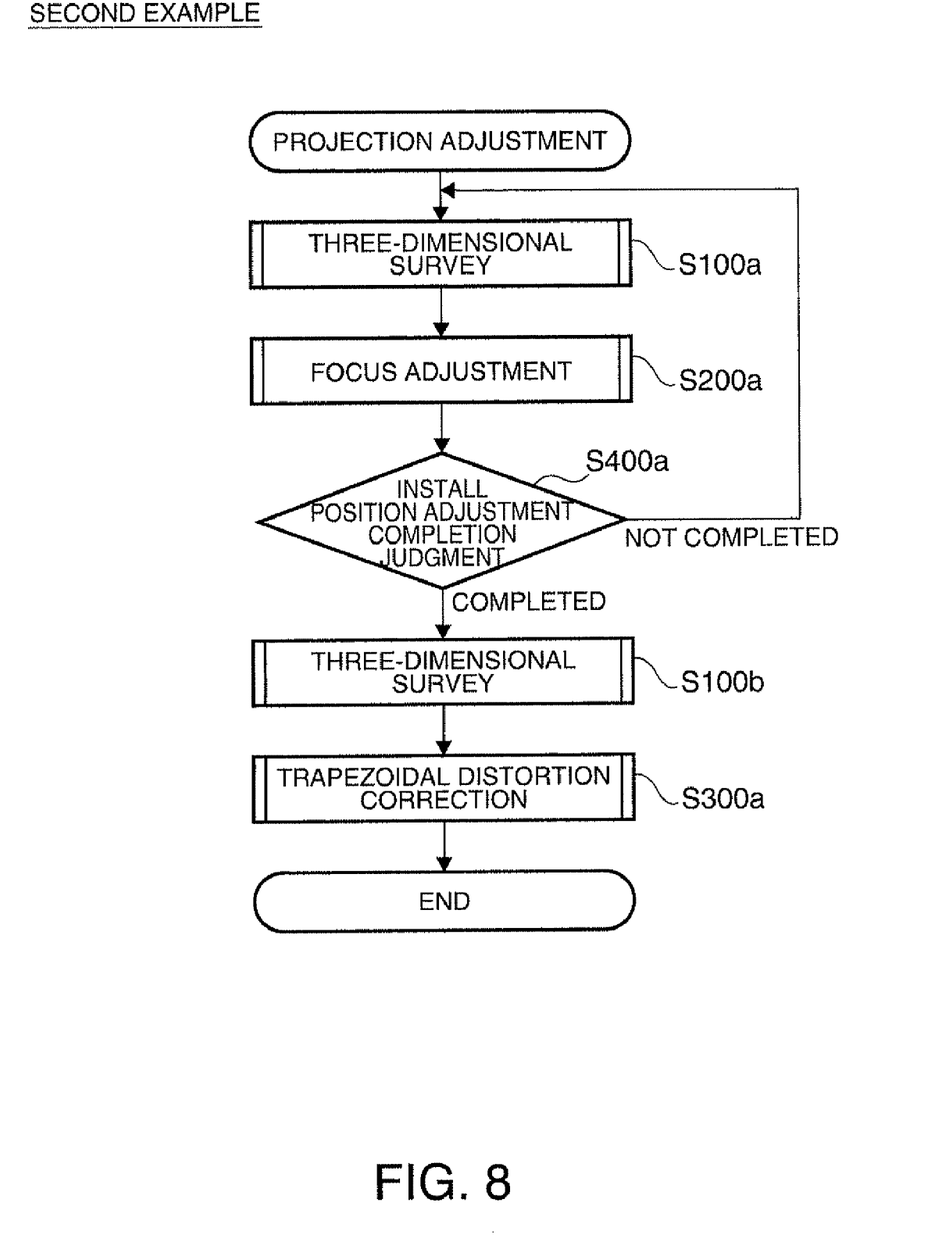
FIG. 8 is a flowchart showing the projection adjustment in a second example.

FIG. 8 shows the procedure of the projection adjustment in the second example. The step labeled with a lower-case alphabetical character appended to the reference numeral indicates that the process in that step is the same as that in the step having the same reference numeral in the first example. First, the user operates the projection adjustment button 192 to initiate the projection adjustment. When the projection adjustment is initiated, the CPU 120 initiates the three-dimensional survey (step S100a) shown in FIG. 8. The three-dimensional survey involves projecting the combined image 330 shown in FIG. 3A on the screen SC, calculating a plane that approximates the screen, and performing the focus adjustment based on the calculation result (step S200a), as described in the first example. Since the projected, combined image is brought into focus at this point, the guide display in the combined image is readily visually recognized. The user, who has visually recognized the guide display, initiates the install position adjustment. In the second example, the installation position completion judgment is made at this point (step S400a). That is, only the focus adjustment for bringing the projected image into focus is repeated until the user has completed install position adjustment. The user performs the install position adjustment while checking the focused, combined image.

Figure 3B:
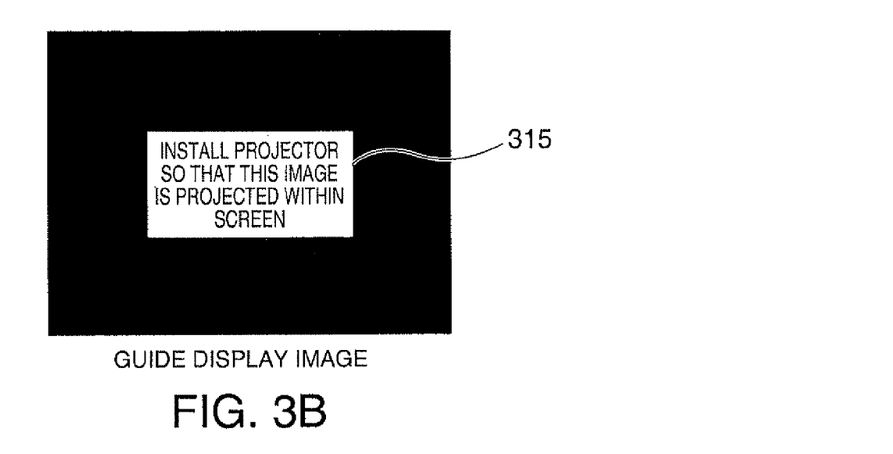
Figure 3C:
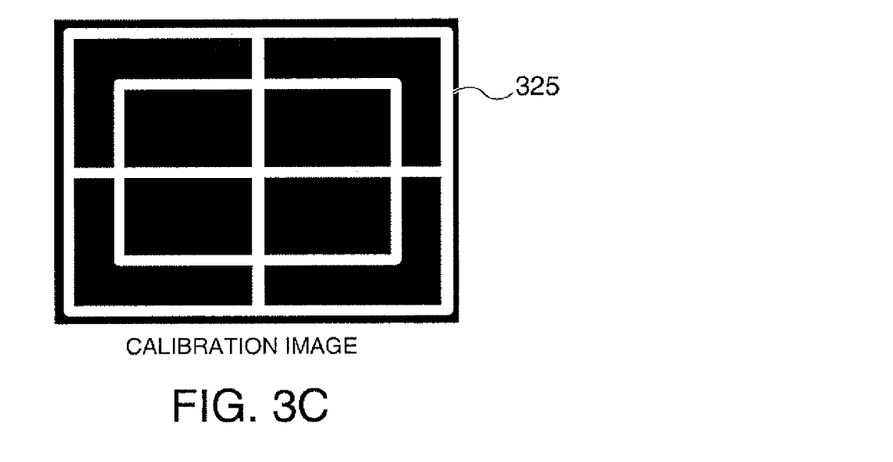

When the user has completed the install position adjustment and operates the adjustment stop button 193 on the remote controller, the three-dimensional survey (step S100b) is initiated again. Thereafter, the trapezoidal distortion correction (step S300a) is performed, and the projection adjustment is terminated. In the three-dimensional survey (step S100b) performed after the user has completed the install position adjustment, no guide display image 315 is displayed, unlike the three-dimensional survey (step S100a) performed during the install position adjustment. In the three-dimensional survey performed after the install position adjustment is completed, only the calibration image shown in FIG. 3C is displayed.

As described above, in the second example, only the focus adjustment is performed during the install position adjustment performed by the user. Therefore, even when the user has trouble completing the install position adjustment and hence the position where the projector 100 is installed is not determined for a long time, the combined image 330 is always in focus and sharply displayed during the install position adjustment. Since the trapezoidal distortion correction is performed after the install position has been adjusted, the trapezoidal distortion correction performed by the projector 100 and the modification of the position where the projector 100 is installed performed by the user will not conflict with each other. Performing the trapezoidal distortion correction after the projection adjustment is completed allows quick focus adjustment and reliable trapezoidal distortion correction can be both achieved.

C. THIRD EXAMPLE

A third example will next be described. The third example differs from the first example, as in the second example, only in that the three-dimensional survey, the focus adjustment, the trapezoidal distortion correction, and the install position judgment are performed in a different order. Therefore, no detailed redundant description of the configuration of the projector and the processes performed in the projector will be made.

Figure 9:
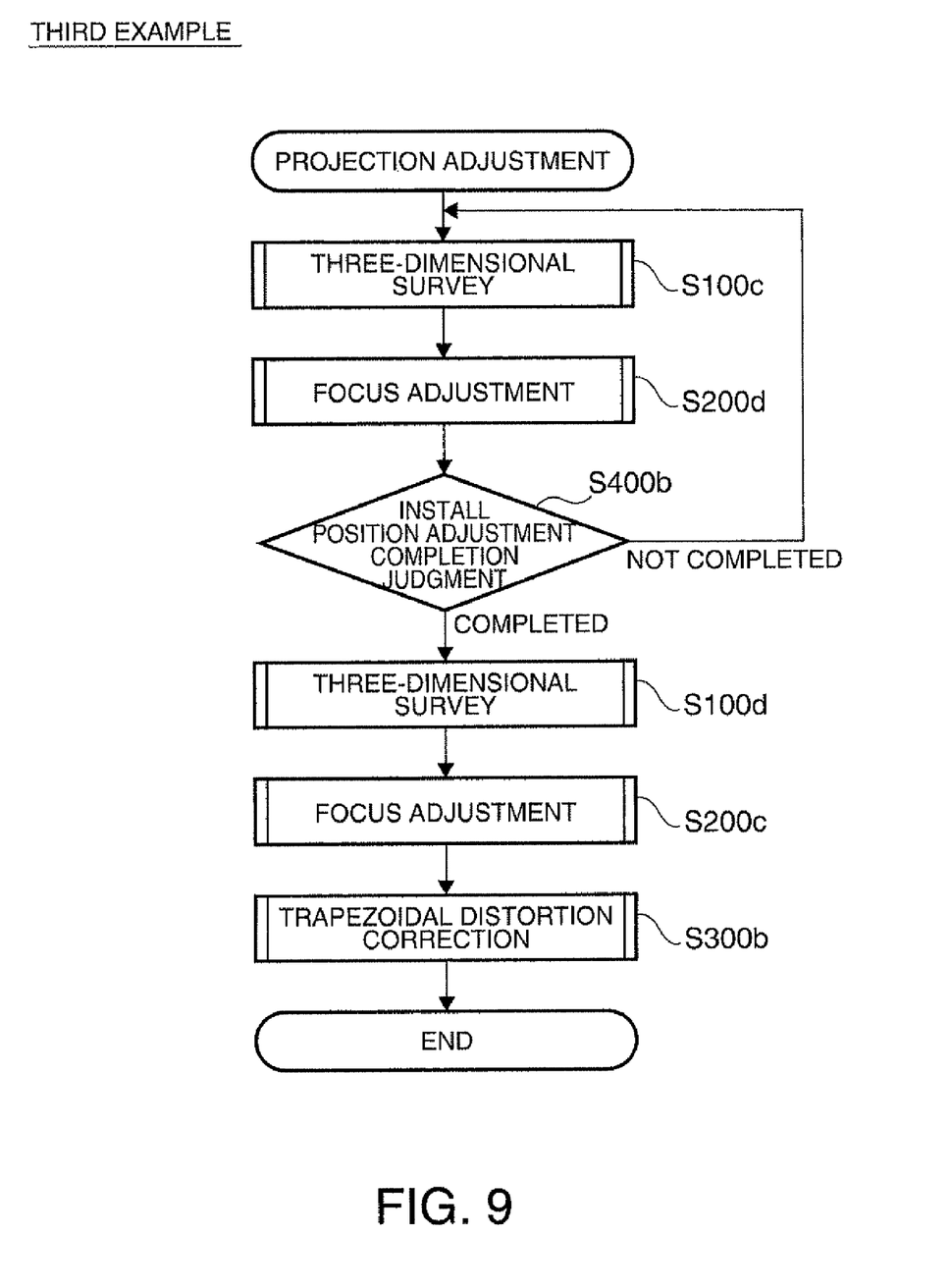
FIG. 9 is a flowchart showing the projection adjustment in a third example.

FIG. 9 shows the procedure of the projection adjustment in the third example. When the user's operation of the projection adjustment button 192 is detected, the CPU 120 initiates the projection adjustment routine shown in FIG. 9. When the projection adjustment is initiated, the three-dimensional survey (step S100c) is first performed. In the three-dimensional survey, the combined image 330 shown in FIG. 3A is projected on the projection surface, and a plane that approximates the screen is calculated. The CPU 120, which has calculated the plane that approximates the screen SC, performs the focus adjustment based on the calculation result (step S200b). Since the projected, combined image is brought into focus at this point, the user can visually recognize the guide display in the combined image. The user, who has visually recognized the guide display, initiates the install position adjustment. Although the install position completion judgment is made at this point (step S400b), the three-dimensional survey or the focus adjustment is not repeated in the third example even when the user has not yet completed the install position adjustment, but the CPU 120 in effect waits until the user has completed the install position adjustment.

When the user has completed the install position adjustment and operates the adjustment stop button 193 on the remote controller, the three-dimensional survey (step S100d) is initiated again. Thereafter, the focus adjustment (step S200c) and the trapezoidal distortion correction (step S300b) are performed, and the projection adjustment is terminated. In the second three-dimensional survey (step S100d), no guide display image 315 is displayed, but only the calibration image shown in FIG. 3C is displayed, as in the second example.

As described above, in the third example, when the projection adjustment is initiated, the focus adjustment is performed only once until the user has completed the install position adjustment. The reason for this is that the user seldom greatly changes the distance between the projector 100 and the screen SC in the install position adjustment, and the user only needs to operate the projection adjustment button 192 again if the user wants to greatly change the distance between them. Since the focus adjustment is performed only once during the install position adjustment, the focus adjustment motor 157 will not be driven unnecessarily, whereby the demand for energy saving can be satisfied. Further, since the install position adjustment performed by the user is followed by the series of processes starting from the three-dimensional survey (step S100d), final focus adjustment and trapezoidal distortion correction can be precisely performed.

In the second and third examples described above, after the user has completed the install position adjustment, the three-dimensional survey (step S100b or S100d) is performed again. While in these examples, the three-dimensional survey performed by the user during the install position adjustment is the same as the three-dimensional survey after the user has completed adjustment the install position, the two three-dimensional survey operations may differ from each other. For example, since it is conceivable that an image signal to be projected has already been externally inputted when the three-dimensional survey is performed after the install position adjustment has been completed, a calibration image may be superimposed on the externally inputted, projected image and the combined image may be projected, unlike the situation described above in which only the dedicated calibration image 325 shown in FIGS. 3A to 3C is projected. In this case, two captured images are prepared, one by superimposing a normal calibration image on an input projected image and the other by superimposing the reversed calibration image in terms of pixel value on the projected image. The calibration image can be precisely extracted from the captured images by subtracting one of them from the other.

D. VARIATIONS

The invention is not limited to the examples and embodiment described above, but can be implemented in a variety of aspects to the extent that they do not depart from the spirit of the invention. For example, the following variations are possible.

D1. Variation 1

Figure 10A:
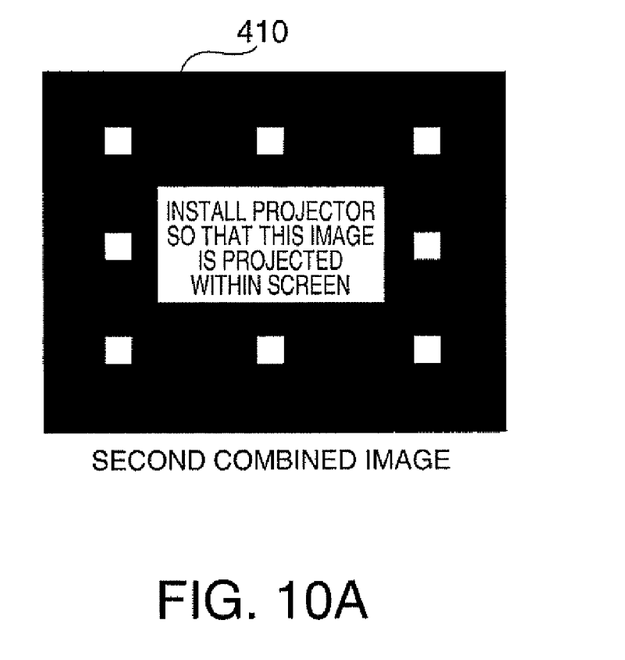
FIGS. 10A and 10B describe images used in variations.
Figure 10B:
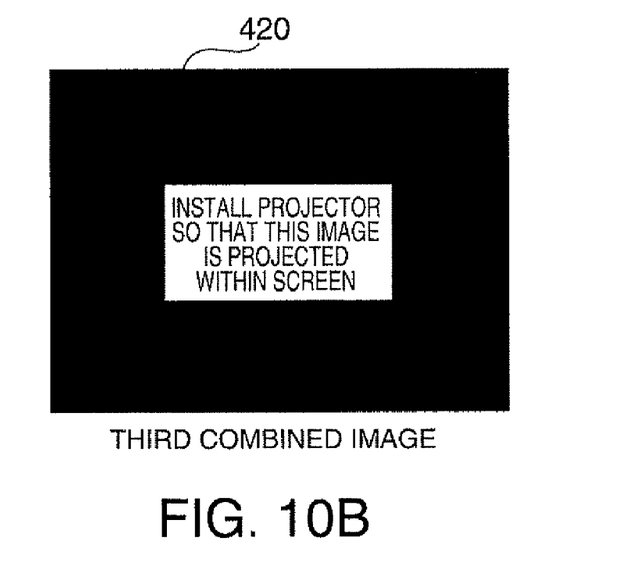

While in the above examples, the combined image 330 obtained by combining the guide display image 315 and the calibration image 325 shown in FIGS. 3A to 3C is used to perform the projection adjustment, the guide display image 315 and the calibration image 325 are not limited to those shown in FIGS. 3A to 3C, as described above. For example, as shown in FIG. 10, a calibration image in which a plurality of white rectangular areas having a predetermined size are arranged can be used to produce a second combined image 410 for the projection adjustment, or the four corners (apexes) of the white rectangular area in which the guide display is displayed can be used to extract at least three measurement points, as shown in a combined image 420. To detect the contour of the white rectangle, a differential filter, a Laplacian filter, or any other suitable contour extracting filter can be used.

Further, the contents displayed in the guide display image are not limited to characters, but may be an animation image, a symbol mark representing a company name, or a display having a shape that does not overlap with the shapes in the calibration image used as the measurement points when the guide display image is combined with the calibration image. The contents and the shape of the guide display are not limited to specific ones.

Further, while the liquid crystal panel 130 is used as the light modulator in the projector 100, a DLP projector using a DMD (Digital Mirror Device) may be used as the light modulator. Moreover, the image sensor used in the image capturing unit 180 is not limited to a CCD, but may be a CMOS device. Further, the light source used in the illumination system 140 is not limited to an arc lamp, but may be an LED, a semiconductor laser, or any other suitable semiconductor light source.

While the user initiates the projection adjustment by operating the projection adjustment button 192 on the remote controller 191, the projection adjustment may be initiated when the projector is powered on and an initial screen is projected, or may be initiated when the start and stop of the install position adjustment performed by the user are detected by an acceleration sensor that is provided in the projector and sensed vibration of the projector body.

Part of the functions achieved by software in the examples described above may be achieved by hardware, or part of the functions achieved by hardware in the examples described above may be achieved by software.

The entire disclosure of Japanese Patent Application No. 2008-301500, filed Nov. 26, 2008 is expressly incorporated by reference herein.

What is claimed is:

1. A projection-type display apparatus that projects an image toward a projection surface and displays the image thereon, the apparatus comprising:
    a projecting section that includes a focal length adjusting mechanism and projects an image;
    an adjustment image controlling section that uses the projecting section to project a guide display image suggesting how to adjust the position where the projection-type display apparatus is installed and uses the projecting section to project a calibration image having a predetermined shape when the guide display image is projected;
    a projection distance measuring section that measures a projection distance that is the distance to the projection surface based on a captured image obtained by capturing the calibration image; and
    a focus adjusting section that operates the focal length adjusting mechanism based on the projection distance to perform focus adjustment so that the displayed guide display image is brought into focus.

2. The projection-type display apparatus according to claim 1,
    wherein the adjustment image controlling section superimposes the guide display image and the calibration image on each other to form a single image and projects the single image by using the projecting section.

3. The projection-type display apparatus according to claim 2,
    wherein the calibration image is disposed at the periphery of the guide display image in the single superimposed image.

4. The projection-type display apparatus according to claim 1,
    wherein the calibration image is projected during at least part of the period when the guide display image is projected.

5. The projection-type display apparatus according to claim 1,
    wherein the calibration image has a shape capable of at least identifying three coordinates that can define a plane.

6. The projection-type display apparatus according to claim 1 further comprising:
    a trapezoidal distortion correcting section that corrects trapezoidal distortion of a projected image projected by the projection-type display apparatus based on a captured image obtained by capturing the calibration image.

7. The projection-type display apparatus according to claim 6,
    wherein the trapezoidal distortion correcting section performs the trapezoidal distortion correction after the focus adjustment is performed.

8. The projection-type display apparatus according to claim 7,
    wherein the trapezoidal distortion correction is performed after the projection of the guide display image is completed.

9. A projection adjustment method used with a projection-type display apparatus that projects an image toward a projection surface and displays the image thereon, the method comprising:
    projecting a guide display image suggesting how to adjust the position where the projection-type display apparatus is installed;
    projecting a calibration image having a predetermined shape when the guide display image is projected;
    measuring a projection distance that is the distance to the projection surface based on a captured image obtained by capturing the calibration image; and
    operating a focus adjusting mechanism based on the projection distance to perform focus adjustment so that the displayed guide display image is brought into focus.

* * * * *